(12) United States Patent
Hsieh

(10) Patent No.: US 8,227,934 B2
(45) Date of Patent: Jul. 24, 2012

(54) MONITORING SYSTEM AND INPUT DEVICE THEREOF

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 237 days.

(21) Appl. No.: 12/781,954

(22) Filed: May 18, 2010

(65) Prior Publication Data

US 2011/0175446 A1      Jul. 21, 2011

(30) Foreign Application Priority Data

Jan. 16, 2010   (CN) .......................... 2010 1 0300370

(51) Int. Cl.
 *H02J 3/14* (2006.01)
(52) U.S. Cl. ................. 307/31; 307/38; 307/39; 702/64; 340/426.28; 340/425.5
(58) Field of Classification Search .................... 307/31, 307/38, 39; 702/64; 340/426.28, 425.5, 340/539.22, 545.1, 815.4, 2.1
See application file for complete search history.

(56) References Cited

U.S. PATENT DOCUMENTS

| | | | | |
|---|---|---|---|---|
| 4,455,453 | A  * | 6/1984 | Parasekvakos et al. | 379/106.06 |
| 5,757,643 | A  * | 5/1998 | Kuroda et al. | 700/9 |
| 6,144,110 | A  * | 11/2000 | Matsuda et al. | 307/10.1 |
| 6,700,224 | B2 * | 3/2004 | Biskup et al. | 307/116 |
| 6,751,544 | B2 * | 6/2004 | Hashimoto et al. | 701/107 |
| 7,889,105 | B2 * | 2/2011 | Zushi et al. | 341/120 |

* cited by examiner

*Primary Examiner* — Patrick Salce

(74) *Attorney, Agent, or Firm* — Altis Law Group, Inc.

(57) ABSTRACT

A monitoring system includes a controller, a number of input devices, a number of digital sensors, a number of analog sensors, a number of displays, and a number of alarms. Each input device includes a switching circuit, an input circuit, and a connector. The connector is connected to a digital sensor or an analog sensor. The switching circuit includes an n-channel metal-oxide-semiconductor field effect transistor (MOSFET), a p-channel MOSFET, a first resistor, and a second resistor. The input circuit includes an operational amplifier and a third resistor.

8 Claims, 4 Drawing Sheets

MONITORING SYSTEM AND INPUT DEVICE THEREOF

CROSS-REFERENCE

Relevant subject matter is disclosed in six co-pending U.S. patent application Ser. Nos. 12/641,230, 12/781,927, 12/791,933, 12/770,779, 12/781,940 and 12/781,951 assigned to the same assignee as this patent application.

BACKGROUND

1. Technical Field

The present disclosure relates to monitoring systems and, particularly, to a monitoring system with input devices.

2. Description of Related Art

Most monitoring systems are designed to monitor certain conditions such as temperature or pressure changes. The number of conditions may be limited and as such the number of input devices or sensors are fixed. Further, some input devices are integrated into the monitoring system. As a result, it is inconvenient to modify such a monitoring system to expand its input capability.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure with the accompanying drawings in which like references indicate similar elements is illustrated by way of example and not by way of limitation. It should be noted that references to "an" or "one" embodiment in this disclosure are not necessarily to the same embodiment, and such references mean at least one.

Figure 1:
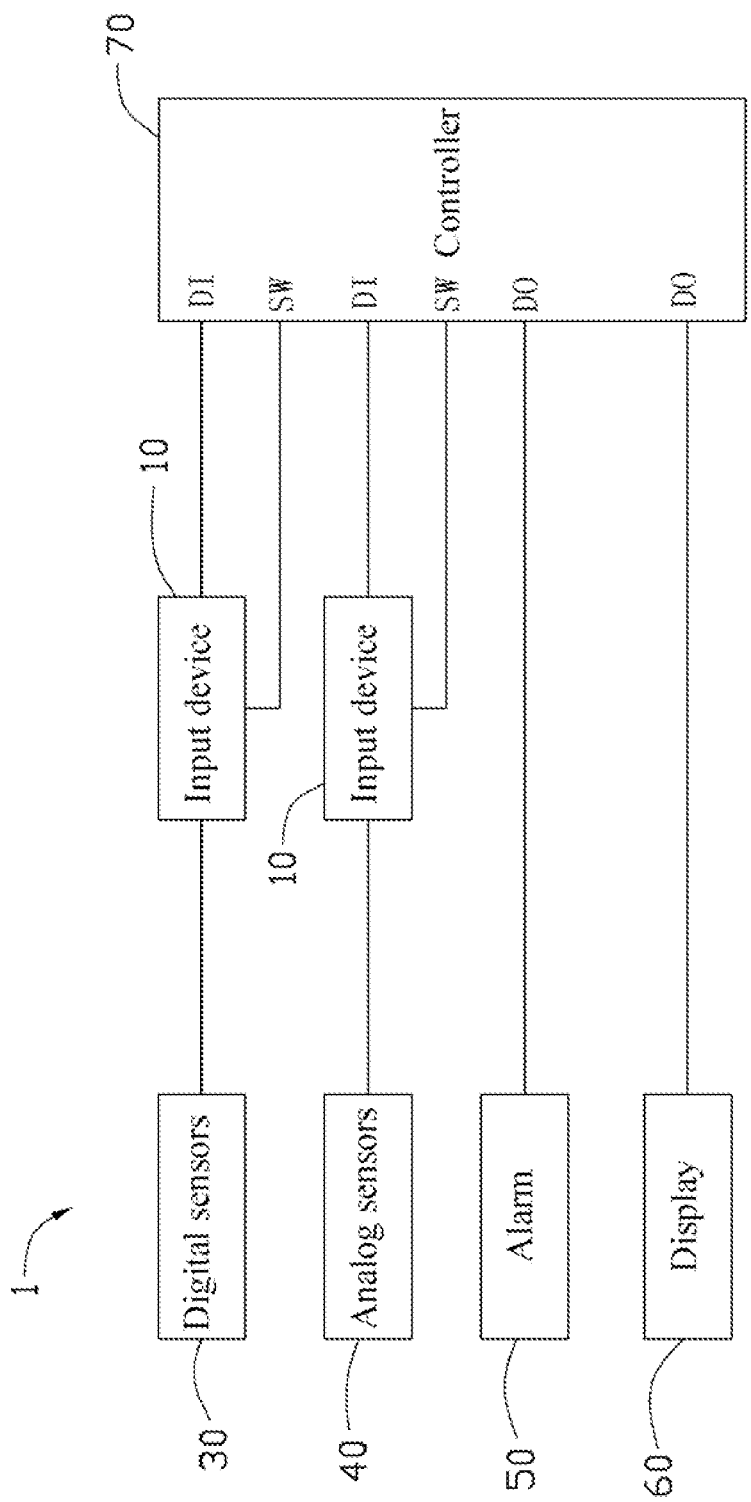
FIG. 1 is a schematic block diagram of an exemplary embodiment of a monitoring system, the monitoring system including input devices.

Referring to FIG. 1, an exemplary embodiment of a monitoring system 1 includes two input devices 10, a digital sensor 30, an analog sensor 40, an alarm 50, a display 60, and a controller 70. In another embodiment, the monitoring system 1 may include a plurality of input devices 10, a plurality of digital sensors 30, a plurality of analog sensors 40, a plurality of alarms 50, a plurality of displays 60, and a controller 70. A sum of the digital sensors 30 and the analog sensors 40 is equal to the number of the input devices 10. In the embodiment, the analog sensors 40 are potential of hydrogen (pH) responsive sensors. Each digital sensor 30 may be mounted in a locale, such as on a door. When the door is open, a switch of the digital sensor 30 is turned off. When the door is closed, the switch of the digital sensor 30 is turned on. There is one alarm 50 for each digital sensor 30, and one display 60 for each analog sensor 40.

The controller 70 includes a plurality of input terminals DI, a plurality of output terminals DO, and a plurality of control terminals SW.

Each input device 10 is connected between one of the digital sensors 30 or one of the analog sensors 40 and the controller 70. The alarms 50 and the displays 60 are respectively connected to the output terminals DO of the controller 70.

When an input device 10 is connected to one of the digital sensors 30, the input device 10 converts a digital signal of the digital sensor 30 to a first detection signal and transmits the first detection signal to the controller 70. When an input device 10 is connected to one of the analog sensors 40, the input device 10 converts an analog signal of the analog sensor 40 to a second detection signal and transmits the second detection signal to the controller 70. The controller 70 controls the corresponding alarm 50 to work according to the first detection signal. The controller 70 controls the corresponding display 60 to display a PH value according to the second detection signal.

Figure 2:
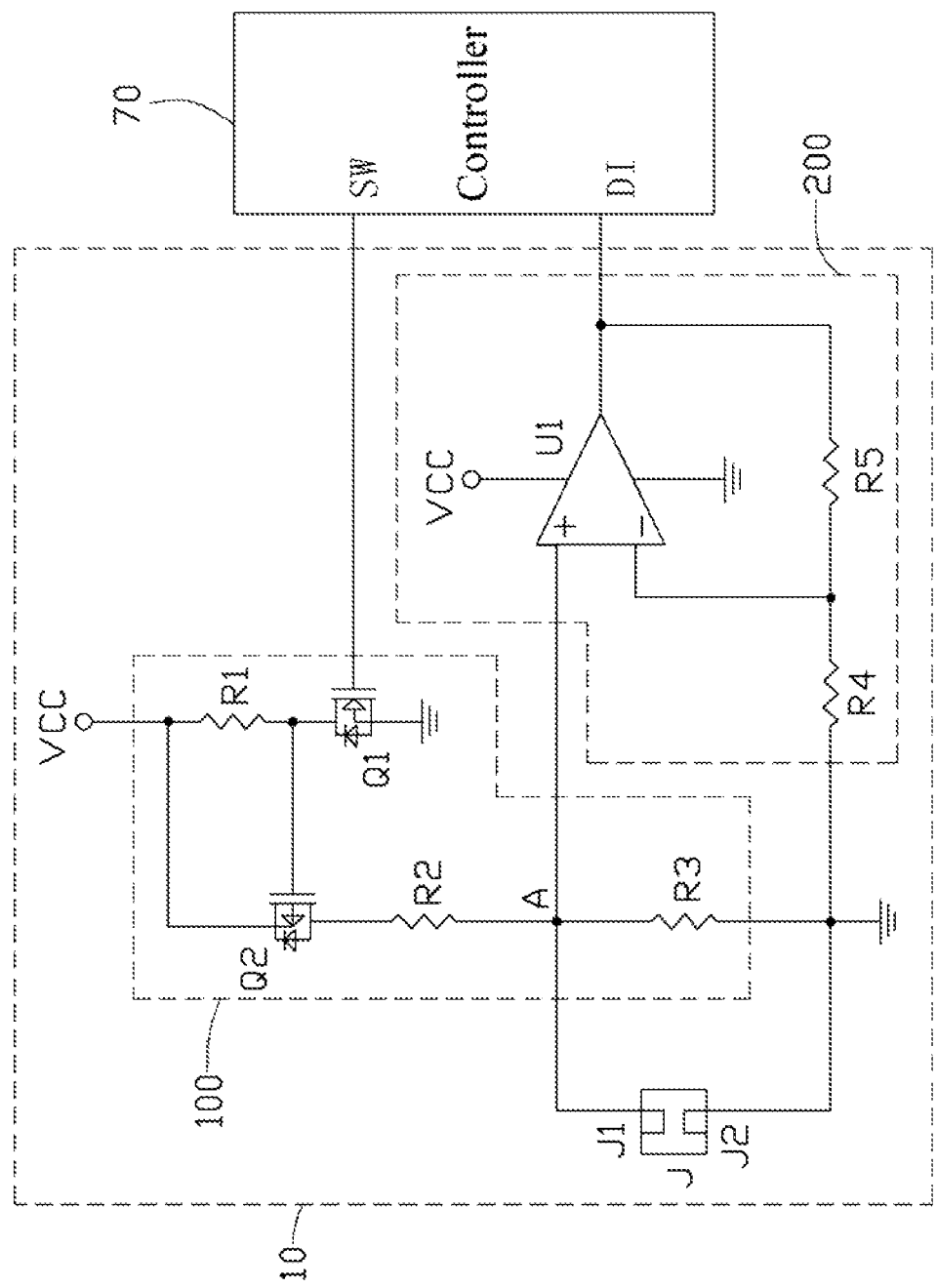
FIG. 2 is a schematic diagram of one of the input devices in FIG. 1.

Referring to FIG. 2, the input device 10 includes a switching circuit 100, an input circuit 200, and a connector J. The switching circuit 100 is connected between a control terminal SW of the controller 70 and the connector J. The input circuit 200 is connected between the switching circuit 100 and an input terminal DI of the controller 70. The connector J is connected to the digital sensor 30 or the analog sensor 40.

The switching circuit 100 receives the digital signal of the digital sensor 30 or the analog signal of the analog sensor 40 and outputs the first detection signal or the second detection signal. The input circuit 200 transmits the first detection signal or the second detection signal to the controller 70.

The controller 70 controls status of the switching circuit 100 and receives the first detection signal and the second detection signal. When the input device 10 is connected to the digital sensor 30, the controller 70 controls the switching circuit 100 to receive the digital signal of the digital sensor 30. At the same time, the controller 70 receives the first detection signal via the input circuit 200. When the input device 10 is connected to the analog sensor 40, the controller 70 controls the switching circuit 100 to receive the analog signal of the analog sensor 40. At the same time, the controller 70 receives the second detection signal via the input circuit 200.

The controller 70 controls an alarm 50 to work according to the first detection signal. For example, the controller 70 controls the alarm 50 to alarm when the controller 70 receives a first detection signal indicating that temperature is less than a predetermined value. The controller 70 controls a display 60 to display a pH value according to the second detection signal.

The switching circuit 100 includes metal-oxide-semiconductor field effect transistors (MOSFETs) Q1 and Q2, and resistors R1~R3. The MOSFET Q1 is an n-channel MOSFET. The MOSFET Q2 is a p-channel MOSFET.

A drain of the MOSFET Q1 is connected to a power source VCC via the resistor R1. A gate of the MOSFET Q1 is connected to the control terminal SW of the controller 70. A source of the MOSFET Q1 is grounded. A gate of the MOSFET Q2 is connected to the drain of the MOSFET Q1. A source of the MOSFET Q2 is connected to the power source VCC. A first terminal of the resistor R3 is connected to a drain of the MOSFET Q2 via the resistor R2 and connected to a first terminal J1 of the connector J. A second terminal of the resistor R3 is connected to a second terminal J2 of the connector J and grounded.

The input circuit 200 includes an operational amplifier U1, resistors R4 and R5.

A non-inverting input of the operational amplifier U1 is connected to a node A between the resistors R2 and R3. An inverting input of the operational amplifier U1 is connected to an output of the operational amplifier U1 via the resistor R5 and grounded via the resistor R4. The output of the operational amplifier U1 is also connected to the input terminal DI of the controller 70. A power terminal of the operational amplifier U1 is connected to the power source VCC. A ground terminal of the operational amplifier U1 is grounded.

Figure 3:
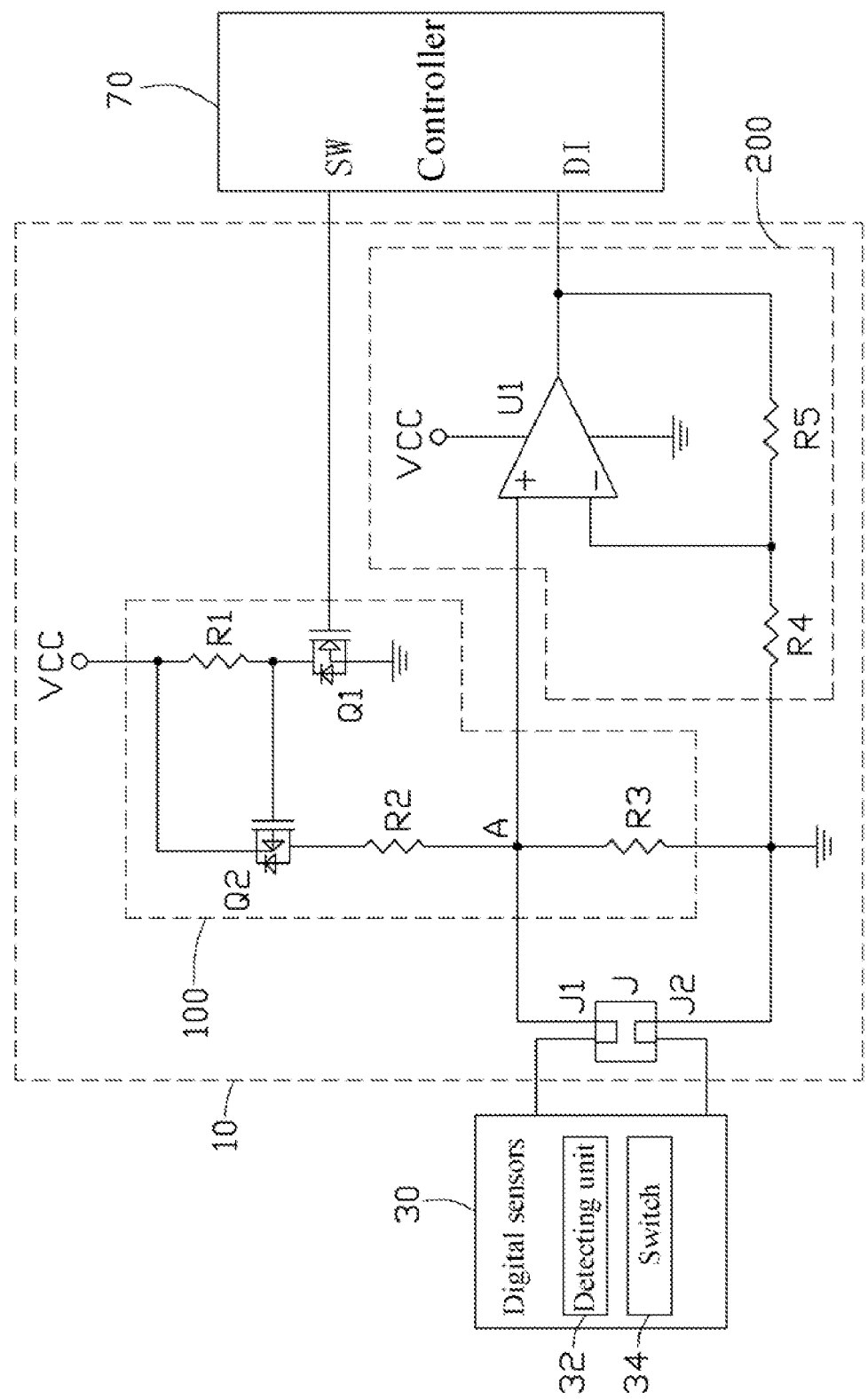
FIG. 3 is a schematic circuit diagram of one of the input devices of FIG. 2 connected to a digital sensor.

Referring to FIG. 3, the digital sensor 30 includes a detecting unit 32 and a switch 34. When the first terminal J1 of the connector J, the digital sensor 30, and the second terminal J2 of the connector J are connected in series, the control terminal SW of the controller 70 is set at a high voltage level. The MOSFET Q1 of the switching circuit 100 is turned on. The gate of the MOSFET Q2 is at a low voltage level. The MOSFET Q2 is turned on.

The relationship of the voltage of the power source VCC, the voltage Va of the node A, and resistances of the resistors R2 and R3 is shown as below.

$$Va = VCC \times R3/(R2+R3)$$

When the door is open, the switch 34 of the digital sensor 30 is turned off. The input terminal DI of the controller 70 receives the output of the operational amplifier U1. The controller 70 determines that the door is open because the input terminal DI of the controller 70 is at a high voltage level.

When the door is closed, the switch 34 of the digital sensor 30 is turned on. The voltage Va of the node A is 0 volts.

The input terminal DI of the controller 70 receives the output of the operational amplifier U1. The controller 70 determines that the door is close because the input terminal DI of the controller 70 is at a low voltage level.

Figure 4:
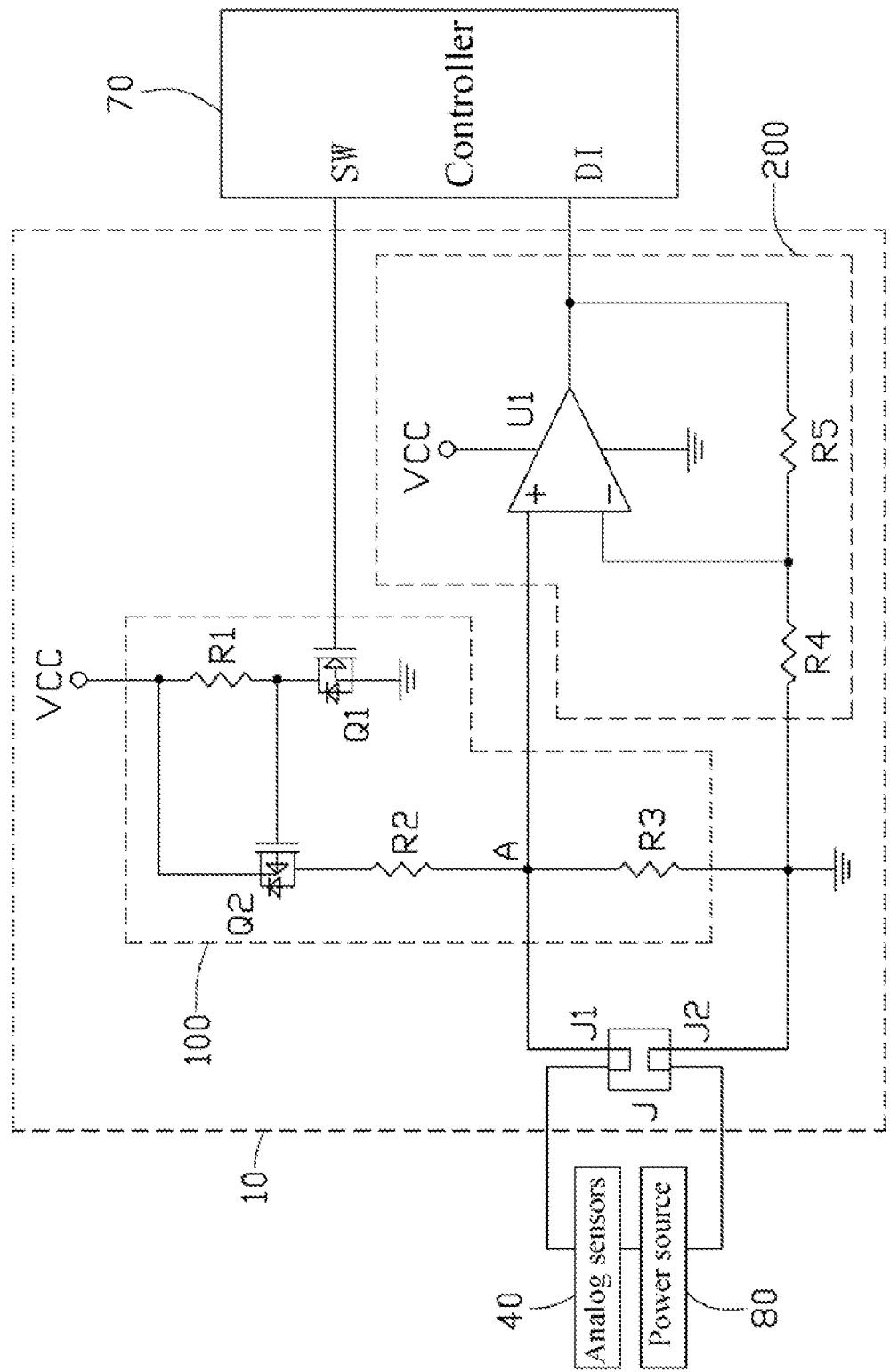
FIG. 4 is a schematic circuit diagram of one of the input devices of FIG. 2 connected to an analog sensor.

Referring to FIG. 4, when the first terminal J1 of the connector J, the analog sensor 40, a power source 80, and the second terminal J2 of the connector J are connected in series, the control terminal SW of the controller 70 is set at a low voltage level. The MOSFET Q1 of the switching circuit 100 is turned off. The gate of the MOSFET Q2 is at a high voltage level. The MOSFET Q2 is turned off.

The analog sensor 40 detects a pH value, and the voltage Va of the node A changes correspondingly to changing of the temperature.

The input terminal DI of the controller 70 receives the output of the operational amplifier U1. The controller 70 stores a plurality of voltage values and a plurality of corresponding pH values. The controller 70 determines the pH value by comparing the voltage signal of the node A with the pH values. The controller 70 controls the displays 60 to display the pH value.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A monitoring system, comprising:
    a controller comprising a plurality of input terminals, a plurality of output terminals, and a plurality of control terminals;
    a plurality of digital sensors;
    a plurality of analog sensors;
    a plurality of input devices, wherein a sum of the plurality of digital sensors and the plurality of analog sensors is equal to a number of the plurality of input terminals of the controller, each input device comprises a switching circuit, an input circuit, and a connector, the connector is connected to one of the plurality of digital sensors or connected to one of the plurality of analog sensors and a first power source in series, the switching circuit comprises an n-channel metal-oxide-semiconductor field effect transistor (MOSFET), a p-channel MOSFET, a first resistor, and a second resistor, a drain of the n-channel MOSFET is connected to a second power source via the first resistor, a gate of the n-channel MOSFET is connected to the control terminal of the controller, a source of the n-channel MOSFET is grounded, a gate of the p-channel MOSFET is connected to the drain of the n-channel MOSFET, a source of the p-channel MOSFET is connected to the second power source, a first terminal of the second resistor is connected to a drain of the p-channel MOSFET and connected to a first terminal of the connector, a second terminal of the second resistor is connected to a second terminal of the connector and grounded, the input circuit comprises an operational amplifier and a third resistor, a non-inverting input of the operational amplifier is connected to a node between the second resistor and the first terminal of the connector, an inverting input of the operational amplifier is connected to an output of the operational amplifier via the third resistor, the output of the operational amplifier is also connected to the input terminal of the controller;
    a plurality of alarms connected to some of the plurality of output terminals of the controller, wherein a number of the plurality of alarms is equal to the number of the plurality of digital sensors; and
    a plurality of displays connected to others of the plurality of output terminals of the controller, wherein a number of the plurality of displays is equal to the number of the plurality of analog sensors.

2. The monitoring system of claim 1, wherein the plurality of analog sensors are potential of hydrogen responsive sensors.

3. The monitoring system of claim 1, wherein the switching circuit further comprises a fourth resistor, the first terminal of the second resistor is connected to the drain of the p-channel MOSFET via the fourth resistor.

4. The monitoring system of claim 1, wherein the input circuit further comprises a fourth resistor, the inverting input of the operational amplifier is grounded via the fourth resistor.

5. An input device connected between a controller and a digital sensor or an analog sensor, the input device comprising:
    a connector connected to the digital sensor or connected to the analog sensor and a first power source in series;
    a switching circuit comprising an n-channel metal-oxide-semiconductor field effect transistor (MOSFET), a p-channel MOSFET, a first resistor, and a second resistor, wherein a drain of the n-channel MOSFET is connected to a second power source via the first resistor, a gate of the n-channel MOSFET is connected to a control terminal of the controller, a source of the n-channel MOSFET is grounded, a gate of the p-channel MOSFET is connected to the drain of the n-channel MOSFET, a source of the p-channel MOSFET is connected to the second power source, a first terminal of the second resistor is connected to a drain of the p-channel MOSFET and connected to a first terminal of the connector, a second terminal of the second resistor is connected to a second terminal of the connector and grounded; and an input circuit comprising an operational amplifier and a third resistor, wherein a non-inverting input of the operational amplifier is connected to a node between the second resistor and the first terminal of the connector, an inverting input of the operational amplifier is connected to an output of the operational amplifier via the third resistor, the output of the operational amplifier is also connected to an input terminal of the controller.

6. The input device of claim 5, wherein the analog sensor is a potential of hydrogen responsive sensor.

7. The input device of claim 5, wherein the switching circuit further comprises a fourth resistor, the first terminal of the second resistor is connected to the drain of the p-channel MOSFET via the fourth resistor.

8. The input device of claim 5, wherein the input circuit further comprises a fourth resistor, the inverting input of the operational amplifier is grounded via the fourth resistor.

* * * * *